US005578910A

United States Patent [19]

Moon

[11] Patent Number: 5,578,910

[45] Date of Patent: Nov. 26, 1996

[54] SKEW MOTOR DRIVING CIRCUIT

[75] Inventor: Hong-Kweon Moon, Kyongki-Do, Rep. of Korea

[73] Assignee: Samsung Electro-Mechanics Co., Ltd., Kyongki-do, Rep. of Korea

[21] Appl. No.: 490,627

[22] Filed: Jun. 15, 1995

[51] Int. Cl.$^{6}$ .................................................. G05B 19/29

[52] U.S. Cl. .......................... 318/285; 318/266; 318/466; 318/649; 343/715; 343/903

[58] Field of Search .................................... 318/260–293, 318/470–476, 632, 649, 640; 343/713, 704, 861, 715, 903, 900, 901, 359

[56] References Cited

U.S. PATENT DOCUMENTS 4,072,886 2/1978 Dammeyer .............................. 318/602
4,275,394 6/1981 Mabuchi et al. .......................... 318/78
4,446,407 5/1984 Sperber .................................. 318/282
4,542,326 9/1985 Hornback ................................ 318/565
4,730,152 3/1988 Foust et al. ............................. 318/266
4,761,593 8/1988 Nakase ................................... 318/473
4,873,526 10/1989 Katsuo .................................... 343/713
4,990,836 2/1991 Nakase et al. .......................... 318/285
5,061,936 10/1991 Suzuki .................................... 343/713

FOREIGN PATENT DOCUMENTS 4-172722 6/1992 Japan .
5-175864 7/1993 Japan .
5-218887 8/1993 Japan .

*Primary Examiner*—Paul Ip
*Attorney, Agent, or Firm*—Lowe, Price, LeBlanc & Becker

[57] ABSTRACT

This invention relates to a skew motor driving circuit of satellite video receiver for eliminating a remaining voltage of ripple form generated at skew motor in a satellite video receiver such as SVR and the like. The invention is an apparatus for receiving a satellite video, a third transistor Q3 for executing on/off operation in response to control signal controlling a skew motor, a first transistor Q1 for supplying/ cutting a skew motor input power 1 in conjunction with the operation of the third transistor, a fourth transistor Q4 for eliminating a remaining voltage remaining upon cutting a driving voltage supplied to said skew motor by an operation being contrary to the operation of said first and third transistors, and a second transistor Q2 for supplying skew pulses to the skew motor in response to the skew pulse signal.

2 Claims, 2 Drawing Sheets

SKEW MOTOR DRIVING CIRCUIT

BACKGROUND OF THE INVENTION

The present invention relates to a skew motor driving circuit for satellite video receiver (SVR), and more particularly to a skew motor driving circuit of satellite video receiver for eliminating a skew pulse noise upon fine movement of the skew motor of SVR.

In a satellite communication system of satellite video and the like, supper high frequency signal SHF transmitted from a satellite is received by a parabola antenna, which is low-noise-amplified by a low noise block down converter LNB whereby sent to a receiver which is set at indoor.

Since a radio wave corresponding to each video channel is incident to a parabola antenna and LNB at a predetermined angle, the radio wave corresponding to each video channel is received by changing an angle of probe provided within the LNB. In order to change the angle of probe, the skew motor is provided to LNB.

Heretofore, the skew motor driving circuit of SVR was constructed as shown in FIG. 1.

Firstly, a skew motor driving power source of a power supply section is connected to an emitter of a transistor Q1 and it is so connected to a base that a power control signal outputted from a control section 1 is inputted through a resistor R1, and a power terminal (+) of the skew motor 3 is connected to a collector at the same time it is grounded through a resistor R2.

On the other hand, it is so connected that a skew pulse outputted from the control section 1 is inputted to a base of transistor Q2 through a resistor R5, an emitter is grounded, a collector is connected to +5 V power through a resistor R4 and at the same time connected to an input terminal S of the skew motor 3, and a ground terminal (–) of the skew motor 3 is grounded.

And, the collector of the transistor Q2 is connected with a resistor R3 in parallel and grounded. In a conventional skew motor driving circuit as this, when a power control signal inputted from the control section 1 is "high", the transistor becomes off and when it is "low" then it becomes on.

When the transistor Q1 becomes on, an inputting power +6 V supplied from the power supply section is supplied to a power terminal (+) of the skew motor 3.

At this moment, in response to a skew pulse signal inputted from the skew terminal of the control section, when the pulse signal is "high", the transistor Q2 becomes on, and when it is "low", it becomes off. The skew pulse is inputted to the input terminal S of the skew motor 3 in accordance with on/off of the transistor Q2. Thus, when the skew pulse is inputted to the skew motor 3 through the transistor Q2 at a state that a power of +6 V is applied to a power terminal (+) of the skew motor 3, the skew motor 3 is rotated in proportion to number of the skew pulses and makes the probe of LNB (+) to be rotated to a predetermined angle whereby makes to move to a receiving location for receiving a frequency of particular channel in optimum.

However, thus in a conventional technique, after the LNB 4 takes an exact position by the skew motor 3, when the skew pulses are continuously applied to the transistor Q2 at a state that the transistor Q1 becomes off and the driving power is not applied to the skew motor 3, as shown in FIG. 1, a remaining voltage being close to ripple is generated to the power terminal (+) of the skew motor 3 and thereby a problem is occurred that the skew motor 3 makes error operation.

In accordance with influence of the ripple remaining voltage, there has been much problems of ill influenced to a remocon operation for controlling the skew motor and generating a shaking phenomenon on a screen.

OBJECT AND SUMMARY OF THE INVENTION

Therefore, the present invention is invented to solve above described conventional various problems, and it is an object of the present invention to provide a skew motor driving circuit of satellite video receiver for eliminating a ripple remaining voltage of skew motor by constructing transistor so as to be operated in conjunction with transistor cutting and connecting a power supplied to the skew motor.

Another object of the present invention is to provide a skew motor driving circuit of satellite video receiver for preventing that a noise in accordance with skew pulse is generated to a power terminal when the power is not applied to the skew motor.

Technical construction for accomplishing the objects of the present invention is made by comprising:

in an apparatus for receiving a satellite video, a third transistor for executing on/off operation in response to a control signal for cutting and connecting a skew motor power, a first transistor for supplying/cutting a skew motor inputting power to the skew motor by being cooperated with operation of said third transistor, a fourth transistor for eliminating a remaining voltage retained upon cutting of driving voltage supplied to the skew motor with operation in contrary to the operation of the first and third transistors, and a second transistor for supplying skew pulses to the skew motor in response to the skew pulse inputting signal.

DETAILED DESCRIPTION OF THE PREFERRED EMBODIMENTS

Hereinafter, a preferred embodiment of the present invention will be described more in detail with reference to the accompanying drawings.

Figure 1:
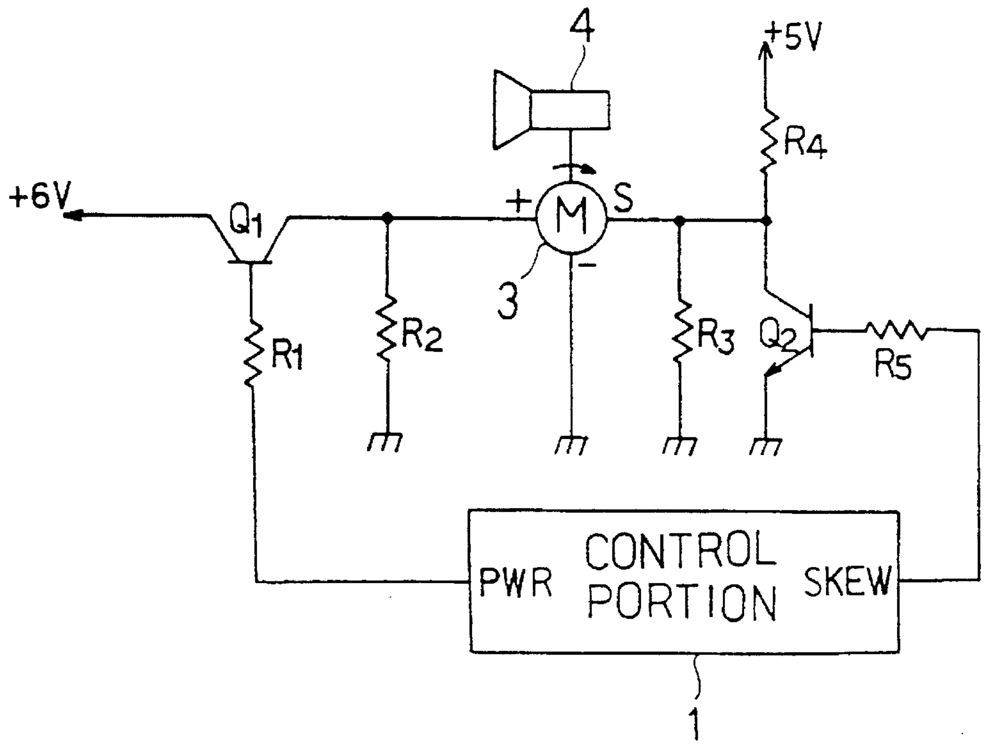
FIG. 1 is a conventional skew motor driving circuit.
Figure 2:
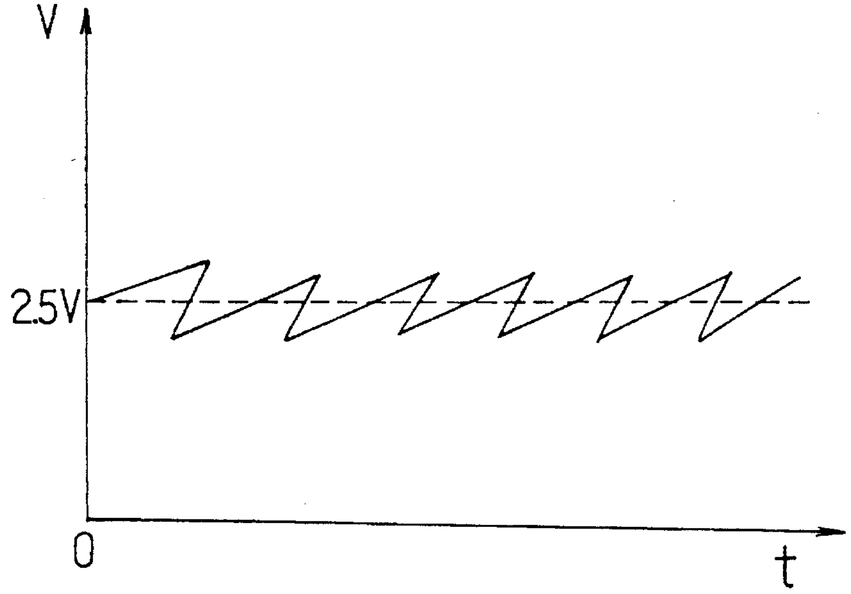
FIG. 2 is a chart showing a ripple remaining voltage generated at the skew motor.
Figure 3:
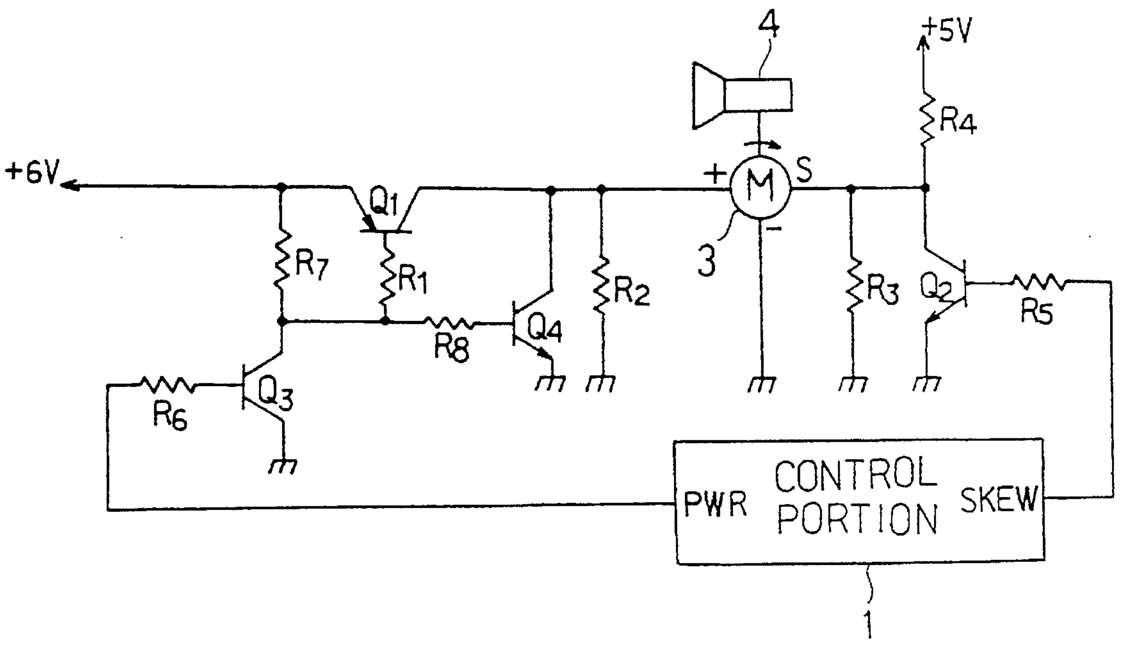
FIG. 3 is a skew motor driving circuit in accordance with the present invention.

FIG. 1 is a circuit diagram showing an embodiment of the present invention.

It is so connected that a skew motor power (+6 V) of power supply section is applied to an emitter of first transistor and at the same time a resistor R7 is connected to a collector of third transistor Q3, an emitter of the third transistor Q3 is grounded, and a base is so connected that a power control signal outputted from an output terminal PWR of a control section 1 is inputted through a resistor R6.

A collector of the third transistor Q3 is connected to a base of the first transistor Q1 through a resistor R1 and at the same time connected to a base of fourth transistor Q4 which is grounded with emitter through a resistor R8.

A collector of the fourth transistor Q4 is connected in parallel to a collector of the first transistor Q1 and at the same time grounded through a resistor R2 in parallel and connected in series to the power terminal (+) of the skew motor 3 and a ground terminal (+) of the skew motor 3 is grounded.

On the other hand, an skew pulse output terminal SKEW of the control section 1 is connected to a base of the second transistor Q2 through a resistor R5 and the emitter is grounded and the collector is connected to +5 V power through a resistor R4 and at the same time connected to the pulse input terminal 8 of the skew motor 3, and a resistor R3 is connected in parallel and grounded.

Operation and effect of them will be described hereinafter.

A skew motor 3 driving power supplied from the power supply section is applied to an emitter of the first transistor Q1 and at the same time applied to a collector of the third transistor Q3 through a resistor R7.

At this moment, when a power control signal outputted from the power control signal output terminal PWR of the control section 1 is "high", since this "high" signal is applied to a base of the third transistor Q3 through the resistor R6, the third transistor Q3 becomes on, and when the third transistor Q3 becomes on, since the base of the first transistor Q1 becomes grounded through the resistor R1 and the third transistor Q3, the first transistor Q1 becomes also on state, and when the power control signal is "low", since this "low" signal is the base of the third transistor Q3, the third transistor Q3 becomes off. When the third transistor Q3 becomes off, since "high" signal is applied to the base of the first transistor Q1, the first transistor Q1 becomes off. At this moment, the power of +6 V is not applied to the power terminal (+) of the skew motor 3.

And at the same time, when the third transistor becomes on, since the collector of the third transistor Q3 is grounded, a "low" signal is applied to the base of the fourth transistor Q4 connected to the collector through the resistor R8 whereby the fourth transistor Q4 becomes off, and when the third transistor Q3 becomes off, since a "high" signal is applied to the base of the fourth transistor Q4, the fourth transistor Q4 becomes on. At this moment, the power of +6 V is applied to the power terminal (+) the skew motor 3 through the transistor Q1.

Accordingly, the third transistor Q3 and the first transistor Q1 execute on/off operation equally, while the third transistor Q3 and the fourth transistor Q4 execute on/off operation to be contrary to each other.

Therefore, since the first transistor Q1 and the fourth transistor Q4 execute also to be contrary to each other, the first transistor Q1 becomes on, and when the fourth transistor Q1 becomes off, a driving voltage is normally applied to the skew motor 3, and the first transistor Q1 becomes off, and when the fourth transistor Q4 becomes on, the driving voltage is not applied to the skew motor 3.

Figure 4:
FIG. 4 is a chart showing a state that any remaining ripple voltage is eliminated at the skew motor in accordance with the present invention.

At this moment, at a time when the driving voltage is not applied to the skew motor 3, since the remaining voltage of the ripple voltage generated by the skew pulse outputted from the skew pulse output terminal SKEW of the control section 1 flows all to ground through the fourth transistor Q4 which has become on, and as shown in FIG. 4, the ripple voltage is not present at the power terminal (+) of the skew motor 3, and only a voltage (+0.2 V) between the emitter and the collector of the transistor Q4 is present.

Accordingly, at a time when the motor driving power is not applied to the skew motor 3 through the first transistor Q1 whereby the skew motor 3 does not operate, even if the skew pulses are continuously applied to the base of the second transistor Q2 through the resistor R5 from the skew pulse output terminal SKEW of the control section 1, the remaining voltage of the ripple voltage is not generated at the power terminal (+) of the skew motor 3, therefore an error operation of the skew motor 3 can be prevented.

Therefore, in accordance with the present invention, problems can be solved in which after the LNB took the exact location by the skew motor, at a state that the driving voltage is not applied to the skew motor, the skew pulse is applied to the skew motor whereby the ripple remaining voltage is generated and thereby the skew motor executes error operation, and thereby giving bad influence to the remocon operation as well as shaking of screen.

What is claimed is:

1. In an apparatus for receiving a satellite video, a skew motor driving circuit of satellite video receiver comprising:

a third transistor Q3 for executing on/off operation in response to a control signal controlling a skew motor power, a first transistor Q1 for supplying/cutting a skew motor inputting power to a skew motor in conjunction with on/off operation of the third transistor, a fourth transistor Q4 for eliminating a remaining voltage remaining upon cutting a driving voltage supplied to the skew motor being contrary to the operation of the first and third transistors, and a second transistor Q2 for supplying skew pulses to the skew motor in response to skew pulse 4 input signal.

2. Skew motor driving circuit of satellite video receiver according to claim 1, wherein said fourth transistor Q4 becomes on state when said first and second transistors are on state whereby flowing a remaining voltage induced to said skew motor by the skew pulse to ground.

* * * * *